United States Patent
Ariyur et al.

(10) Patent No.: US 7,765,062 B2
(45) Date of Patent: Jul. 27, 2010

(54) METHOD AND SYSTEM FOR AUTONOMOUS TRACKING OF A MOBILE TARGET BY AN UNMANNED AERIAL VEHICLE

(75) Inventors: Kartik B Ariyur, Minnetonka, MN (US); Kingsley O. C. Fregene, Andover, MN (US)

(73) Assignee: Honeywell International Inc., Morristown, NJ (US)

( * ) Notice: Subject to any disclaimer, the term of this patent is extended or adjusted under 35 U.S.C. 154(b) by 935 days.

(21) Appl. No.: 11/380,141

(22) Filed: Apr. 25, 2006

(65) Prior Publication Data

US 2007/0250260 A1    Oct. 25, 2007

(51) Int. Cl.
G01C 21/00    (2006.01)
(52) U.S. Cl. .................................. 701/207; 342/357.07
(58) Field of Classification Search .................. 701/200, 701/207, 213–215; 342/357.07; 340/988
See application file for complete search history.

(56) References Cited

U.S. PATENT DOCUMENTS

| | | | |
|---|---|---|---|
| 5,438,517 | A | 8/1995 | Sennott et al. |
| 5,457,634 | A | 10/1995 | Chavravarty |
| 5,555,503 | A | 9/1996 | Kyrtsos et al. |
| 5,559,695 | A | 9/1996 | Daily |
| 5,610,815 | A | 3/1997 | Gudat et al. |
| 5,615,116 | A | 3/1997 | Gudat et al. |
| 5,629,855 | A | 5/1997 | Kyrtsos et al. |
| 5,640,323 | A | 6/1997 | Kleimenhagen et al. |
| 5,684,696 | A | 11/1997 | Rao et al. |
| 5,740,047 | A | 4/1998 | Pilley et al. |
| 5,956,250 | A * | 9/1999 | Gudat et al. .................. 701/26 |
| 2002/0176605 | A1 | 11/2002 | Stafsudd et al. |
| 2003/0203717 | A1 * | 10/2003 | Chuprun et al. ............ 455/12.1 |
| 2003/0212478 | A1 | 11/2003 | Rios |
| 2004/0141770 | A1 | 7/2004 | Maeda et al. |

(Continued)

FOREIGN PATENT DOCUMENTS

EP    0236587    9/1987

(Continued)

OTHER PUBLICATIONS

Ogren, Petter et al., "A Control Lyapunov Function Approach to Multiagent Coordination", "IEEE Transactions on Robotics and Automation", Oct. 2002, pp. 847-851, vol. 18, No. 5, Publisher: IEEE.

*Primary Examiner*—Yonel Beaulieu
(74) *Attorney, Agent, or Firm*—Fogg & Powers LLC

(57) ABSTRACT

A method and system for autonomous tracking of a mobile target such as a ground vehicle by an unmanned aerial vehicle are provided. The method and system utilize an approach that tracks a mobile ground target by using a ground vehicle model with an unmanned aerial vehicle model, with velocity and acceleration constraints. These real-world constraints ensure that the method is applicable to a general class of unmanned aerial vehicles and ground targets. One or more sensors are employed on the unmanned aerial vehicle, with the sensors having at least one field-of-view sensing cone over the ground. A position and path of the mobile target are monitored through input from the sensors on the unmanned aerial vehicle. The method and system detect and estimate the position and path of the mobile target when the target is inside the field-of-view sensing cone.

20 Claims, 4 Drawing Sheets

U.S. PATENT DOCUMENTS

| | | |
|---|---|---|
| 2004/0252864 A1 | 12/2004 | Chang et al. |
| 2005/0004723 A1 | 1/2005 | Duggan et al. |
| 2005/0004759 A1 | 1/2005 | Siegel |
| 2005/0040985 A1 | 2/2005 | Hudson et al. |
| 2005/0114023 A1 | 5/2005 | Williamson et al. |
| 2005/0150997 A1 | 7/2005 | Sjanic |
| 2005/0197749 A1 | 9/2005 | Nichols et al. |

FOREIGN PATENT DOCUMENTS

| | | |
|---|---|---|
| EP | 1560096 | 8/2005 |
| WO | 2005123502 | 12/2005 |

* cited by examiner

METHOD AND SYSTEM FOR AUTONOMOUS TRACKING OF A MOBILE TARGET BY AN UNMANNED AERIAL VEHICLE

GOVERNMENT LICENSE RIGHTS

The U.S. Government may have certain rights in the present invention as provided for by the terms of Contract No. F33615-01-C-1848 with AFRL/Wright Research Site.

BACKGROUND TECHNOLOGY

Unmanned aerial vehicles (UAVs) are remotely piloted or self-piloted aircraft that can carry cameras, sensors, communications equipment, or other payloads. They have been used in a reconnaissance and intelligence-gathering role for many years. More recently, UAVs have been developed for the purpose of surveillance and target tracking.

Autonomous surveillance and target tracking performed by UAVs in either military or civilian environments is becoming an important aspect of intelligence-gathering. However, tracking a moving target on the ground, such as a ground vehicle in motion on a road, with an unmanned aerial vehicle (UAV) presents various difficulties that need to be addressed in order to have an effectively autonomous surveillance and target tracking system. For example, if there are minimum speed limits for the unmanned aerial vehicle, such as any fixed-wing UAV would have, the ground vehicle can easily give the slip to the tracking UAV. Another difficulty that needs to be addressed in a system for autonomous tracking of a moving target is the delay and noise inherent in visual recognition.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

DETAILED DESCRIPTION

Figure 1:
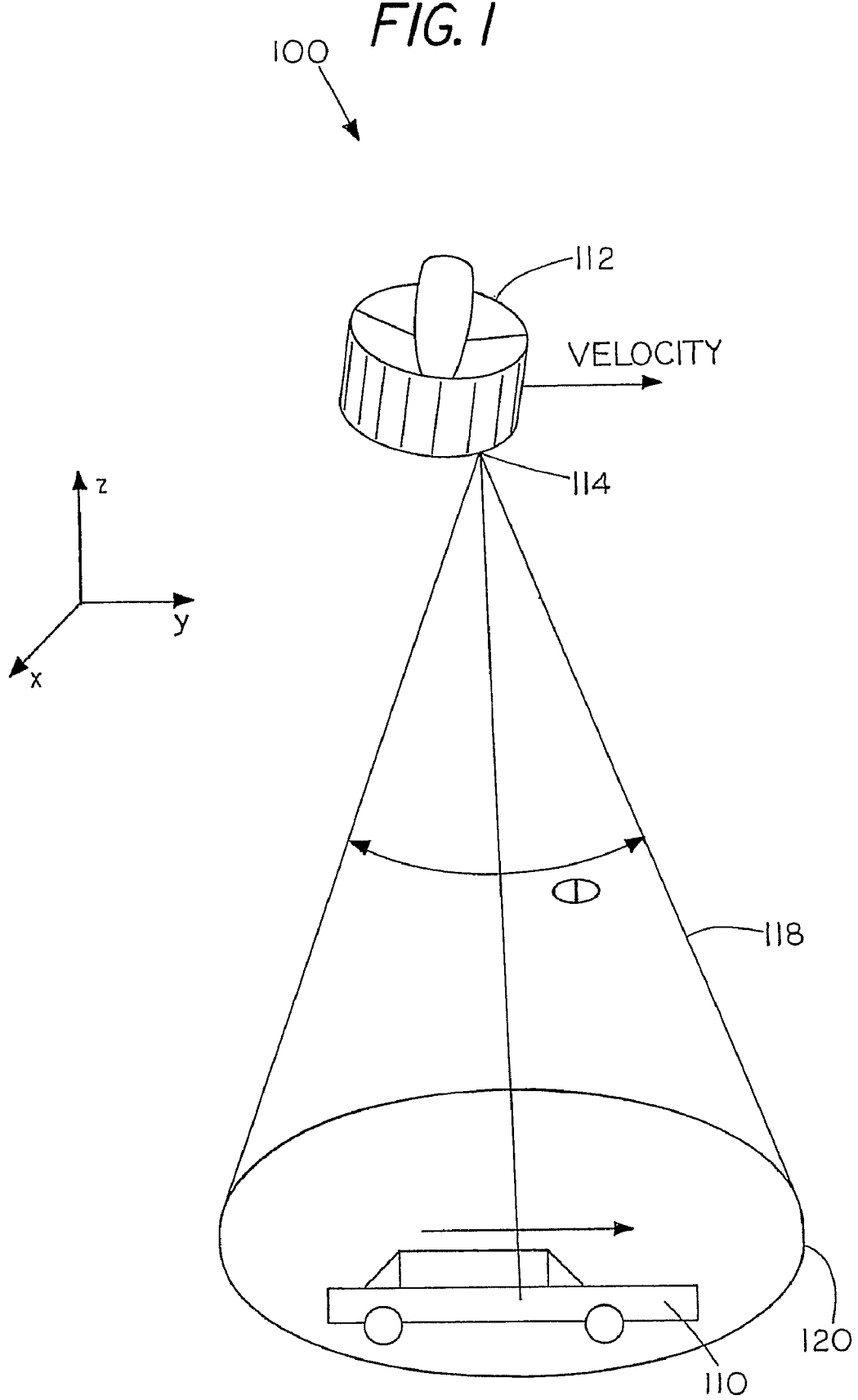
FIG. 1 is a schematic diagram depicting a system for aerial tracking of a ground vehicle according to one embodiment of the invention.

In the following detailed description, embodiments are described in sufficient detail to enable those skilled in the art to practice the invention. It is to be understood that other embodiments may be utilized without departing from the scope of the present invention. The following detailed description is, therefore, not to be taken in a limiting sense.

The present invention relates to a method and system for autonomous tracking of a mobile target, such as a ground motor vehicle, by an unmanned aerial vehicle (UAV). The method and system utilize an approach that tracks a mobile ground target by using a ground vehicle model with an unmanned aerial vehicle model, with velocity and acceleration constraints. These real-world constraints ensure that the method is applicable to a general class of unmanned aerial vehicles and ground targets.

In one approach of the present invention, the tracking of a mobile target is provided by using a ground vehicle model, comprising a two dimensional double integrator point mass model, with an unmanned aerial vehicle model comprising a three dimensional double integrator point mass model, with velocity and acceleration constraints. These constraints capture the capabilities of the real vehicle, thereby ensuring that the method of the invention is applicable to any other vehicle model used. The point mass models capture typical vehicle motion—indeed, an aircraft with closed loop attitude control and position and velocity tracking control loops behaves like a three dimensional double integrator with position and velocity tracking time constants. A sensor model applicable to a wide range of sensors or sensor systems (giving target position and velocity though different means such as vision, radar, or acoustics) can also be used.

It should be understood that the double integrator point mass models described hereafter are merely a simplification of complex dynamic models for ground vehicles and unmanned aerial vehicles. Other model systems may also be employed to implement the present invention.

The present invention can be implemented by utilizing a computer hardware and/or software system, which provides a means for tracking a mobile ground target by using a ground vehicle model with an unmanned aerial vehicle model, with velocity and acceleration constraints. A position and path of the mobile ground target are monitored through input from one or more sensors on the UAV, with the sensors having at least one field-of-view (FOV) sensing cone over the ground. For example, several sensors can be employed by the UAV, giving several FOV cones or a much larger FOV cone. The system and method detect and estimate the position and path of the mobile target when the target is inside the field-of-view sensing cone.

A wide variety of sensors can be used in the UAV, such as visual, radar, acoustic, or laser radar (ladar) sensors. For example, a tracking camera can be used in the UAV. The method and system of the invention also provide for maintaining stable tracking even with extremely noisy tracking sensors. The present invention is described in further detail hereafter.

Sensor Model

A camera sensor is modeled as being able to maintain target detection within a right circular cone vertically beneath the UAV with the cone angle $\theta$ being equal to the field-of-view (FOV) angle $\alpha$ of the camera. Such an arrangement is illustrated in FIG. 1, which is a schematic diagram depicting a system 100 for aerial tracking of a ground vehicle 110 by a UAV 112 having at least one sensor 114. The UAV 112 can either be a hover-capable aerial vehicle or a fixed-wing aerial vehicle. An FOV cone 118 projected by sensor 114 has an FOV circle 120 on the ground. The FOV circle 120 has a radius of z tan $$z \tan \frac{\alpha}{2}$$

where z is the altitude of UAV 112.

Tracking control laws are described hereafter that are exponentially stable and can maintain a stable tracking system even with extremely noisy tracking sensors. The tracking system abstracts essential features of the tracking problem without the distractions of detailed UAV dynamics and various constraints. Furthermore, the present system eases tracking design for UAVs whose attitude stabilization control laws (commonly known as the inner loop) are already implemented, and therefore a given.

Chaser and Prey Models

Purely discretized models are used in the method of the invention as the handling of delays is natural in this setting. However, analogous methods call be developed for the continuous time setting, which is more advantageous if sensor noise characteristics are well known. In this case, a Kalman filter and Kalman predictor could be used to estimate prey vehicle motion (position, velocity and acceleration). The sampling time is denoted with T, and $x_p$, $v_p$ denote planar position $(x_p, y_p)$ and velocity vectors of the prey (i.e., a mobile target such as a ground vehicle), and $x_c$, $v_c$ denote the three dimensional position $(x_c, y_c, z_c)$ and velocity vectors of the chaser (i.e., a UAV). The prey model is simply a double integrator with an unknown acceleration input $a_p$:

$$x_p(k+1) = x_p(k) + Tv_p(k)$$

$$v_p(k+1) = v_p(k) + Ta_p(k)$$

where k=1, 2, 3 . . . is the sampling instant.

The chaser model incorporates information about the position tracking and velocity tracking time constants ($\tau_x$ and $\tau_v$) of the inner loop controller on board the UAV:

$$x_c(k+1) = x_c(k) + Tv_c(k)$$

$$v_c(k+1) = -\frac{T}{\tau_x \tau_v} x_c(k) + \left(1 - \frac{T}{\tau_v}\right) v_c(k) + \frac{T}{\tau_x \tau_v} x_c^{ref},$$

where $x_c^{ref}$ is the current desired location of the chase vehicle to maintain tracking of the target vehicle. The next equation is for the planar position error between the chaser and the prey. The planar component of the vehicle position and velocity are denoted respectively by $x_c^{pl}$ and $v_c^{pl}$:

$$\delta x_{pl} \equiv x_c^{pl} - x_p$$

$$\delta v_{pl} \equiv v_c^{pl} - v_p$$

$$\delta x_{pl}(k+1) = \delta x_{pl}(k) + T\delta v_{pl}$$

$$\delta v_{pl}(k+1) = \begin{array}{c} -\frac{T}{\tau_x \tau_v} \delta x_{pl} + \left(1 - \frac{T}{\tau_v}\right) \delta v_{pl} - \frac{T}{\tau_x \tau_v} x_p(k) - \\ \frac{T}{\tau_v} v_p(k) - Ta_p(k) + \frac{T}{\tau_x \tau_v} x_c^{ref,pl} \end{array},$$

where $x_c^{ref,pl}$ is the planar part of the chaser position set point.

Tracking Control Law

If the tracking set point is set to cancel the terms arising from prey vehicle position, velocity, and acceleration in the error equation above, there will be exponential tracking of the prey. The control law in this case would be:

$$x_c^{ref,pl}(k) = x_p(k) + \tau_x v_p(k) + \tau_x \tau_v a_p(k)$$

However, it is necessary to work from delayed and noisy measurements of the prey position and velocity. To this end, estimates are made of the current prey position, velocity, and acceleration from the measurements. It is assumed that the delay (nT) is an integral multiple of the sampling time T, which is realistic since the sampling time is small compared to the delay. The measurements are:

$$x_p^{meas}(k) = x_p(k-n) + v_1$$

$$v_p^{meas}(k) = v_p(k-n) + v_2.$$

where $v_1$ and $v_2$ represent measurement noise, whose properties under different operating conditions may be available. To estimate the acceleration driving the prey dynamics, a FIR (finite impulse response) filter has been developed. The filter simply takes a weighted average of the m past estimates of acceleration, assuming it to be constant over that time period and giving maximum weight to the most recent estimate.

$$\hat{a}_p = \frac{1}{T} \sum_{i=1}^{m} c_i (v_p^{meas}(k-i+1) - v_p^{meas}(k-i))$$

$$\sum_{i=1}^{m} c_i = 1$$

While the number of past points used and filter coefficients used can be chosen to optimize some objective function, the following were chosen: m=5 and $c_1=17/32$, $c_2=1/4$, $c_3=1/8$, $c_4=1/16$, $c_5=1/32$. Using the estimate of the acceleration, prediction of the current state of the prey (position and velocity) can be performed using the prey double integrator model:

$$\begin{pmatrix} \hat{x}_p \\ \hat{v}_p \end{pmatrix}(k) = A^m \begin{pmatrix} \hat{x}_p \\ \hat{v}_p \end{pmatrix}(k-m) + \sum_{i=1}^{m-1} A^i b \hat{a}_p,$$

$$\text{where } A = \begin{pmatrix} I_2 & TI_2 \\ 0 & I_2 \end{pmatrix}, b = \begin{pmatrix} 0 \\ TI_2 \end{pmatrix}$$

and $I_2$ is the 2×2 identity matrix. It should be noted that the FIR filter is used to account for general or unknown noise characteristics. If noise characteristics are known, optimal filters, such as discrete FIR, discrete Kalman filters, or continuous Kalman filters and predictors can be used.

Finally, the vertical coordinate of the unmanned aerial vehicle is updated with the following gradient descent type law that minimizes the cost function:

$$J = 2 \frac{\|\delta x_{pl}\|^2}{z_c^2 \tan^2 \frac{\alpha}{2}}$$

with respect to $z_c$, giving $$\dot{z}_c = -\gamma \frac{\partial J}{\partial z_c} = 4\gamma \frac{\|\delta x_{pl}\|^2}{z_c^3 \tan^2 \frac{\alpha}{2}}$$

where $\gamma$ is the gain of the gradient scheme (in units of distance$^2$/time). The above cost function is motivated by the idea of maintaining the position of the unmanned aerial vehicle and therefore its tracking camera, within a square inscribed inside the field-of-view circle on the ground.

The following examples are given to illustrate the present invention, and are not intended to limit the scope of the invention.

EXAMPLES

Simulations were performed with the above control law on a representation of a typical military operations urban terrain (MOUT) with both a hover-capable chaser UAV and a fixed-wing chaser UAV. The fixed-wing chaser cannot go slower than a minimum velocity. The UAV capabilities were as follows: maximum speeds of 25 m/s (hover-capable) and 40 m/s (fixed-wing), maximum acceleration of 10 m/s$^2$, $\tau_x$=0.25 s, $\tau_y$=0.5 s, the minimum speed for the fixed-wing vehicle was 25 m/s, and the vehicle flew between 25 m and 50 m above ground level (AGL). The field-of-view of the camera was taken as $\alpha$=120°.

Figure 2:
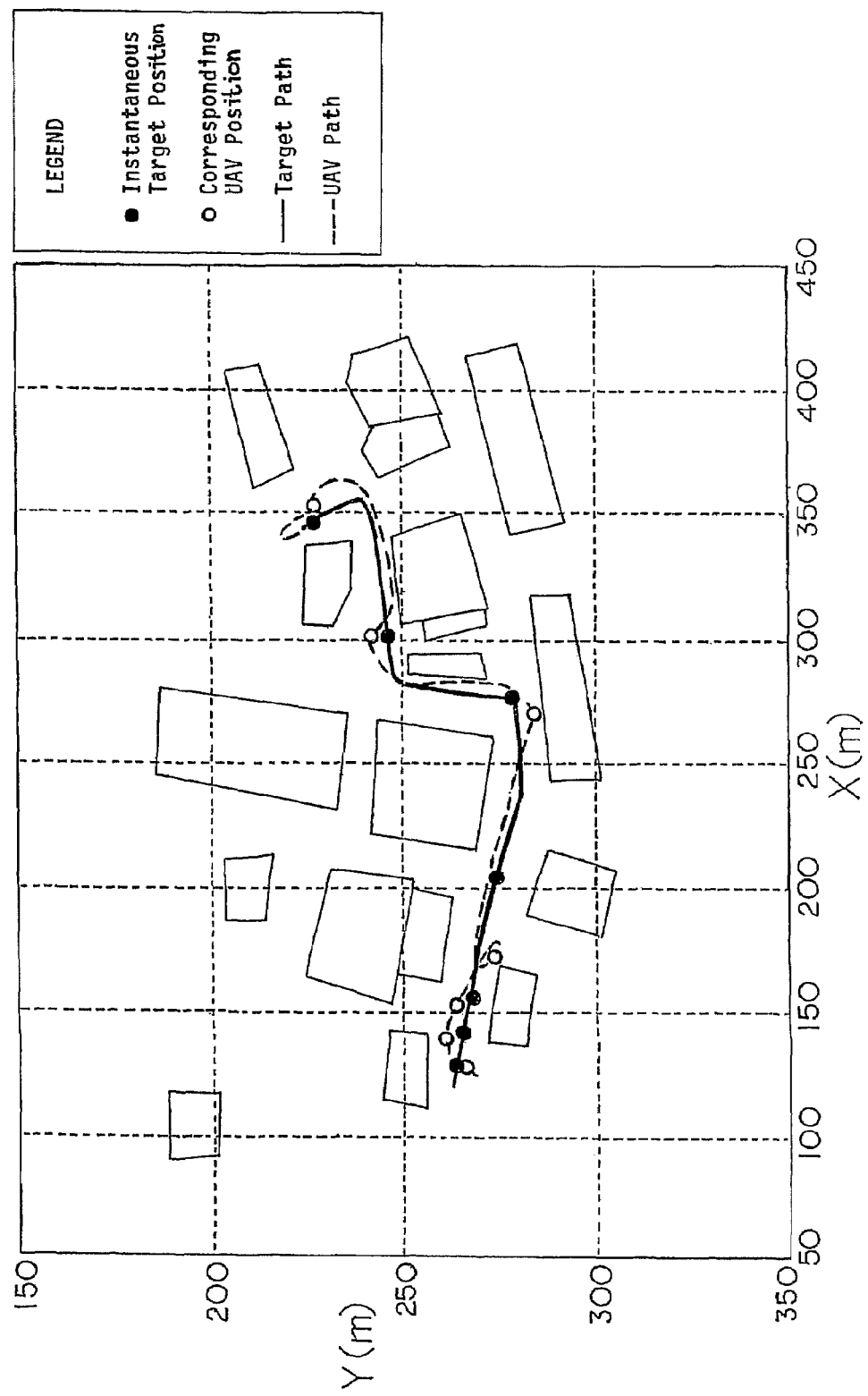
FIG. 2 is schematic overhead view depicting the path of a ground vehicle and the chase path covered by a hover-capable unmanned aerial vehicle in an urban setting.
Figure 4:
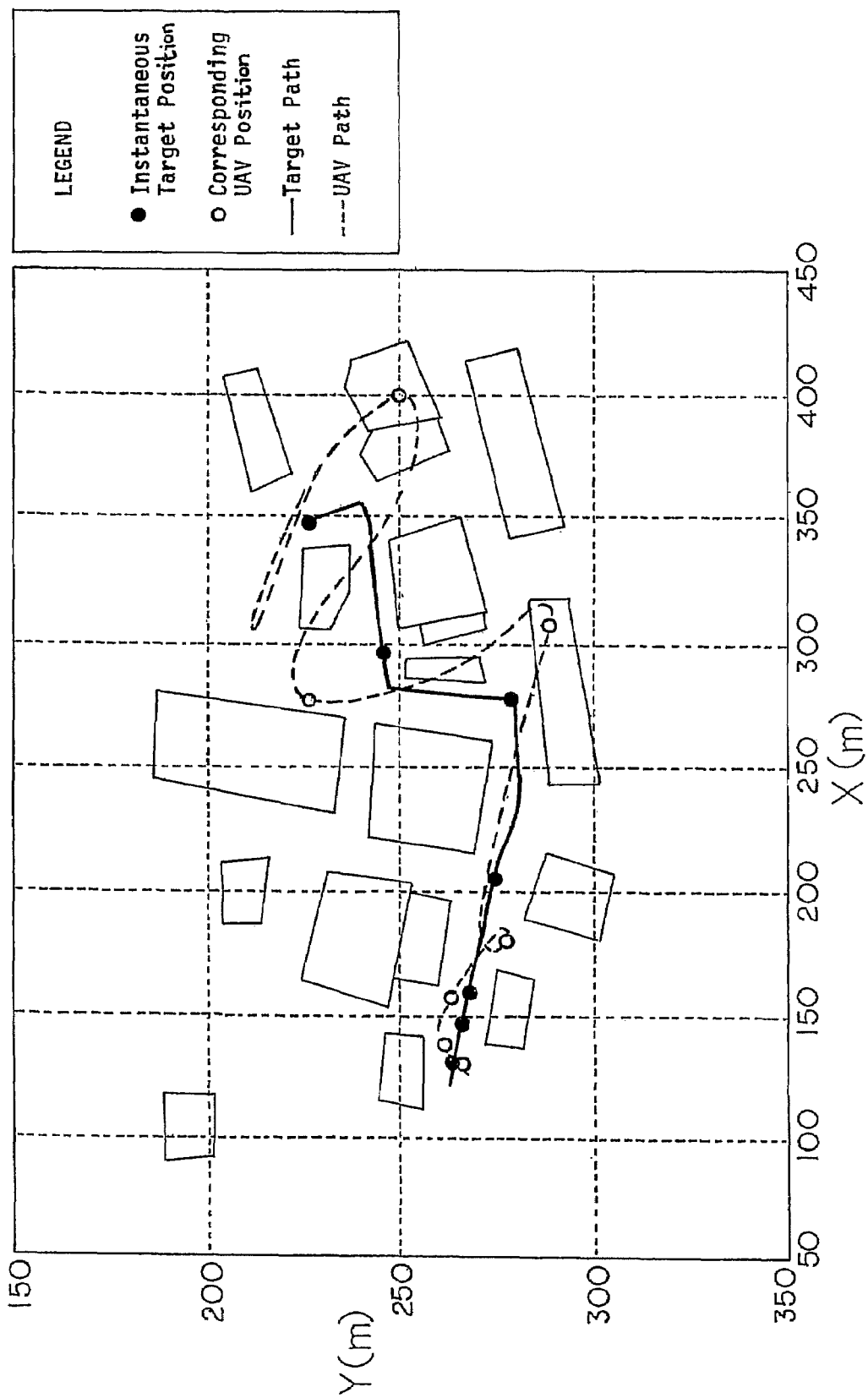
FIG. 4 is a schematic overhead view depicting the path of a ground vehicle and the chase path covered by a fixed-wing unmanned aerial vehicle in an urban setting.

FIGS. 2 and 4 are schematic overhead map views depicting the chase path results for the hover-capable and fixed-wing UAVs, respectively. The instantaneous target vehicle (prey) position in each case is denoted by solid circles at times of 1, 2, 3, 7, 14, 21, and 28 seconds (moving from left to right on the maps in FIGS. 2 and 4). The corresponding UAV (chaser) position is represented by an open circle at those same times. The path of the target vehicle is represented by a continuous solid line and the path of the UAV is represented by a dotted line. The target vehicle is always either accelerating or decelerating at 3 m/s$^2$. The target vehicle has a maximum velocity of 25 m/s (almost 60 mph) and it negotiates turns with a velocity of 7.5 m/s. The measurement noise variance for both position and velocity is 5 units (very large compared to actual values).

Figure 3:
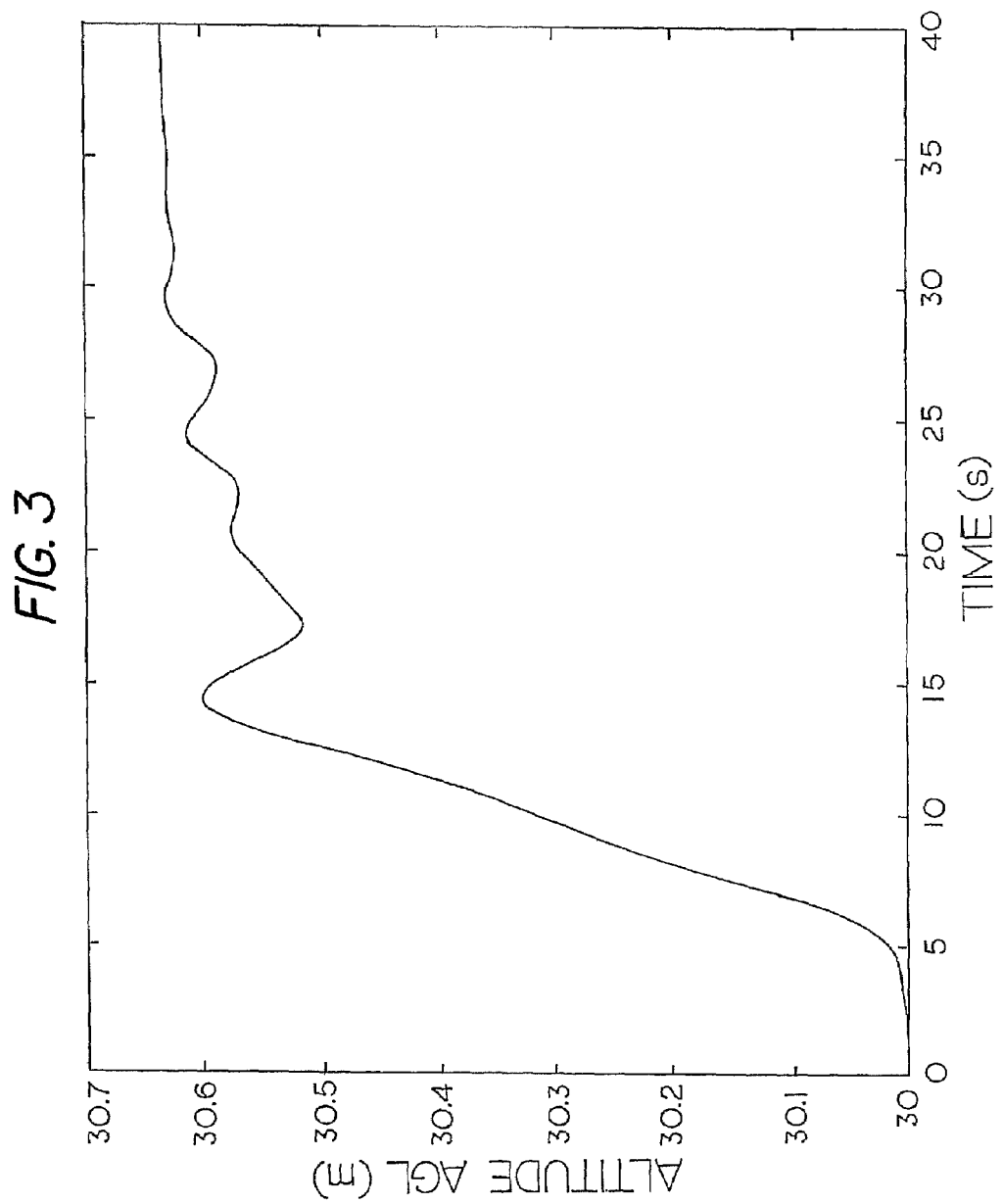
FIG. 3 is a graph of the vertical motion above ground level (AGL) of the hover-capable unmanned aerial vehicle of FIG. 2.

While FIG. 2 depicts the chase path covered by the hover-capable UAV, FIG. 3 is a graph of the vertical motion of the hover-capable UAV, showing the variation of the UAV's altitude AGL during the chase. In this case, the UAV chaser is able to maintain its prey in view while following the prey. The altitude remains in a small range, which is desirable since UAV actuation authority should not be wasted in altering altitude except when necessary.

As shown in FIG. 4, the chase path covered by the fixed-wing UAV includes figure-eights and circles around the prey as the prey slows down at the turns. Such a path is required since the fixed-wing UAV cannot fly slower than 25 m/s.

The UAV chasers are locally exponentially stable by design, since the x and y position error equations are exponentially stable, and the gradient descent is also stable. It may be possible to determine a stability region of the tracking in the presence of UAV constraints using Sum of Squares programming.[1] Performance in the presence of noise and occlusions, with no measurement for a few time steps, is also amenable to analysis in the Stun of Squares framework.

[1] See S. Prajna et al., *SOSTOOLS: Sum of squares optimization toolbox for MATLAB*, available from http://www.cds.caltech.edu/sostools, and http://www.mit.edu/~parillo/sostools, 2004.

Instructions for carrying out the various methods, process tasks, calculations, control functions, and the generation of signals and other data used in the operation of the system and method are implemented, in some embodiments, in software programs, firmware or computer readable instructions. These instructions are typically stored on any appropriate medium used for storage of computer readable instructions such as floppy disks, conventional hard disks, CD-ROM, flash memory ROM, nonvolatile ROM, RAM, and other like medium.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method for autonomous tracking of a mobile ground target by an unmanned aerial vehicle, comprising:
    tracking the mobile ground target by using a ground vehicle model with an unmanned aerial vehicle model, with velocity and acceleration constraints; and
    monitoring a position and path of the mobile ground target through input from one or more sensors on the unmanned aerial vehicle, the sensors having at least one field-of-view sensing cone over the ground.

2. The method of claim 1, wherein the ground vehicle model comprises a two dimensional double integrator point mass model.

3. The method of claim 1, wherein the unmanned aerial vehicle model comprises a three dimensional double integrator point mass model.

4. The method of claim 1, wherein acceleration of the mobile ground target is estimated from a finite impulse response filter.

5. The method of claim 1, wherein monitoring the position and path of the mobile ground target depends upon the mobile target being inside of the field-of-view sensing cone.

6. The method of claim 1, wherein the one or more sensors comprise at least one of a visual sensor, a radar sensor, an acoustic sensor, or a laser radar sensor.

7. The method of claim 1, wherein the sensors having a plurality of field-of-view sensing cones over the ground.

8. The method of claim 1, wherein the mobile ground target comprises a motor vehicle.

9. The method of claim 1, wherein the unmanned aerial vehicle comprises a hover-capable aerial vehicle.

10. The method of claim 1, wherein the unmanned aerial vehicle comprises a fixed-wing aerial vehicle.

11. A system for autonomous tracking of a mobile ground target by an unmanned aerial vehicle, comprising:
    a computer configured to track the mobile ground target by using a ground vehicle model with an unmanned aerial vehicle model, with velocity and acceleration constraints; and
    one or more sensors on the unmanned aerial vehicle that have at least one field-of-view sensing cone over the ground;
    wherein detection of a position and path of the mobile ground target depends upon the mobile target being inside of the field-of-view sensing cone.

12. The system of claim 11, wherein the ground vehicle model comprises a two dimensional double integrator point mass model.

13. The system of claim 11, wherein the unmanned aerial vehicle model comprises a three dimensional double integrator point mass model.

14. The system of claim 11, wherein acceleration of the mobile ground target is estimated from a finite impulse response filter.

15. The system of claim 11, wherein the one or more sensors comprise at least one of a visual sensor, a radar sensor, an acoustic sensor, or a laser radar sensor.

16. The system of claim 11, wherein the unmanned aerial vehicle comprises a hover-capable aerial vehicle.

17. The system of claim 11, wherein the unmanned aerial vehicle comprises a fixed-wing aerial vehicle.

18. A computer program product, comprising:

a computer readable medium having instructions operable to be executed to implement a method for autonomous tracking of a mobile ground target by an unmanned aerial vehicle, the method comprising:

tracking the mobile ground target by using a ground vehicle model with an unmanned aerial vehicle model, with velocity and acceleration constraints; and monitoring a position and path of the mobile ground target through input from one or more sensors on the unmanned aerial vehicle.

19. The computer program product of claim 18, wherein the ground vehicle model comprises a two dimensional double integrator point mass model.

20. The computer program product of claim 18, wherein the unmanned aerial vehicle model comprises a three dimensional double integrator point mass model.

* * * * *